(12) United States Patent
Liu et al.

(10) Patent No.: US 8,283,935 B2
(45) Date of Patent: Oct. 9, 2012

(54) METHOD OF FORMING TOUCH SENSING CIRCUIT PATTERN

(75) Inventors: Chen-Yu Liu, Jhongli (TW); Ching-Yi Wang, Jhongli (TW)

(73) Assignee: TPK Touch Solutions Inc., Taipei (TW)

( * ) Notice: Subject to any disclaimer, the term of this patent is extended or adjusted under 35 U.S.C. 154(b) by 1102 days.

(21) Appl. No.: 12/168,896

(22) Filed: Jul. 8, 2008

(65) Prior Publication Data

US 2009/0277695 A1  Nov. 12, 2009

(30) Foreign Application Priority Data

May 12, 2008  (TW) ................................ 97117372 A

(51) Int. Cl.
*G01R 27/26*  (2006.01)

(52) U.S. Cl. .......................................... 324/662; 341/33

(58) Field of Classification Search ........................ None
See application file for complete search history.

(56) References Cited

U.S. PATENT DOCUMENTS

| 6,970,160 | B2 | 11/2005 | Mulligan et al. | |
| 8,040,321 | B2 * | 10/2011 | Peng et al. | 345/169 |
| 8,059,015 | B2 * | 11/2011 | Hua et al. | 341/33 |
| 2004/0178997 | A1 * | 9/2004 | Gillespie et al. | 345/173 |
| 2008/0036473 | A1 * | 2/2008 | Jansson | 324/678 |

* cited by examiner

*Primary Examiner* — Duy Deo
(74) *Attorney, Agent, or Firm* — Orrick Herrington & Sutcliffe, LLP

(57) ABSTRACT

A method of forming a touch sensing circuit pattern includes steps of: forming a first axial conductive line on a transparent substrate; forming an insulation barrier on the first axial conductive line; forming two separated first axial electrodes, two separated second axial electrodes and the second axial conductive line on the transparent substrate. The first axial electrodes are arranged on two sides of the insulation barrier along a first direction. The second axial electrodes are arranged on two opposite sides of the axial conductive line along a second direction. The second axial conductive line is across on the insulation barrier and connects to the second axial electrodes. The method of the invention can simplify the manufacturing process.

44 Claims, 2 Drawing Sheets

METHOD OF FORMING TOUCH SENSING CIRCUIT PATTERN

FIELD OF THE INVENTION

The invention relates to a method of forming a touch sensing circuit pattern, especially to a technology of forming a touch sensing circuit pattern on a glass substrate.

DESCRIPTION OF THE RELATED ART

Touch panels have been widely used in home appliances, communication devices and electronic information products such as a personal digital assistant (PDA), a home appliance and a game input interface. A touch panel is preferably integrated with a display panel, so a user can touch a displayed image to select an operation. Therefore, a touch panel makes more convenient for operating a PDA, a home appliance, a game input interface, and a public inquiry system.

A touch sensing area of a conventional touch panel is normally arranged on a surface of a substrate. The touch sensing area is utilized for sensing a touch signal generated by a finger or a pen. The touch sensing area is made up of a transparent conductive film (such as ITO). A user can touch the image displayed on the display panel through the transparent conductive film and perform a touch operation.

The conventional touch panels can be divided into many types with reference to different technology principles, such as resistive touch panel, capacitive touch panel, infrared sensing touch panel, electromagnetic sensing touch panel and sound sensing touch panel. The capacitive touch panel detects a capacitance change generated between a human body and a transparent electrode to determine the touch position. Advantageously in light transmittance rate, hardness, accuracy, reaction time, touch life, operating temperature, and the initial strength, capacitive touch panels have been widely used.

To detect the touch position of a finger or a pen on the touch panel, many kinds of capacitive touch sensing technologies have been applied. For example, U.S. Pat. No. 6,970,160 disclosed a lattice touch-sensing system for detecting a position of a touch on a touch-sensitive surface. The lattice touch-sensing system may include two capacitive sensing layers, separated by an insulating material, and each layer consists of substantially parallel conducting elements. Each element may comprise a series of diamond shaped patch that are connected together with narrow conductive rectangular strips. Each conducting element of a given sensing layer is electrically connected to a conductive line. A control circuit may also be included to provide an excitation signal to both sets of conducting elements through the corresponding conductive lines, to receive sensing signals generated by sensor elements when a touch on the surface occurs, and to determine the touch position on each layer.

However, to form the lattice touch-sensing system disclosed in U.S. Pat. No. 6,970,160 on a glass substrate, it must be through two times of vacuum sputtering, exposing, developing and etching processes. So the manufacturing process is very complex.

What is needed is a method of forming a touch sensing circuit pattern which has a simple manufacturing process.

SUMMARY

The invention is to provide method of forming a touch sensing circuit pattern which forms two axial electrodes by sputtering, exposing, developing and etching at one time to simplify the manufacturing process.

A method of forming a touch sensing circuit pattern, includes steps of:

forming a plurality of parallel first axial conductive lines on a transparent substrate;

forming a plurality of separated insulation barriers on first axial conductive lines;

forming a plurality of separated first axial electrodes, a plurality of separated second axial electrodes and a plurality of parallel second axial conductive lines on the transparent substrate, wherein the two adjacent first axial electrodes are arranged on two sides of a corresponding insulation barrier along a first direction so as to be connected by a corresponding first axial conductive line;

two second axial electrodes are arranged on two sides of the first axial conductive line along the second direction; and the second axial conductive lines are across on the insulation barriers and connect to the second axial electrodes to form a touch sensing circuit pattern.

Accordingly, the first axial electrodes and the second axial electrodes can be formed on the transparent substrate by sputtering, exposing, developing and etching at one same time. Thus, the process of manufacturing the touch sensing circuit pattern is simplified.

According to the invention, the first axial conductive lines are made of transparent material or non-transparent material.

And the first axial electrodes, the second axial conductive lines and the second axial electrodes are made of transparent material.

Other objectives, advantages and novel features of the invention will become more apparent from the following detailed description when taken in conjunction with the accompanying drawings, in which:

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe a preferred embodiment of the present touch module, in detail.

Figure 1:
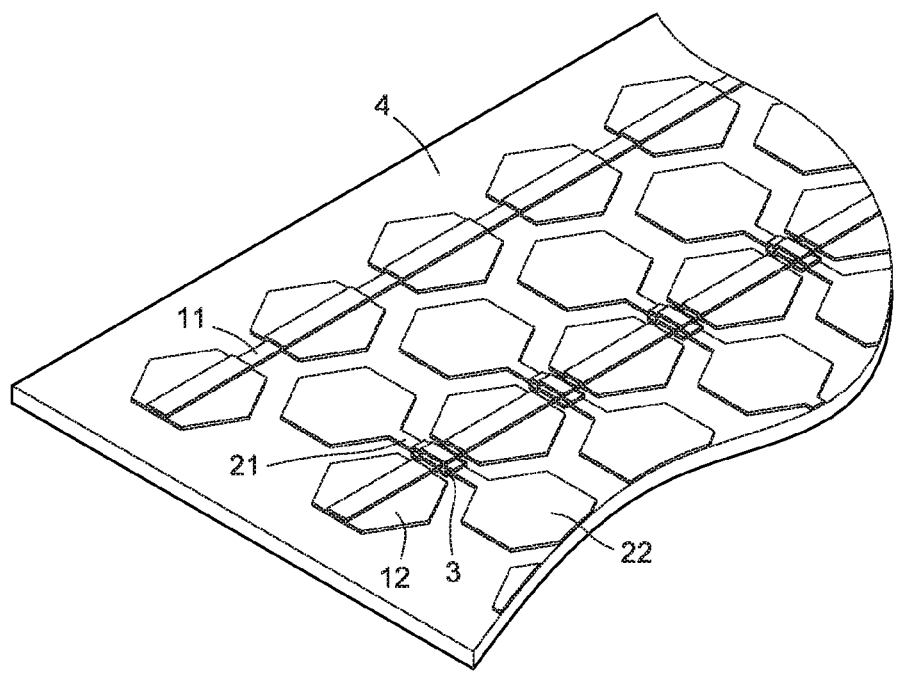
FIG. 1 is a perspective view of a touch sensing circuit pattern according to the invention.

FIG. 1 is a perspective view of a touch sensing circuit pattern according to a preferred embodiment of the invention. A method of forming the touch sensing circuit is described in the following description.

Figure 2:
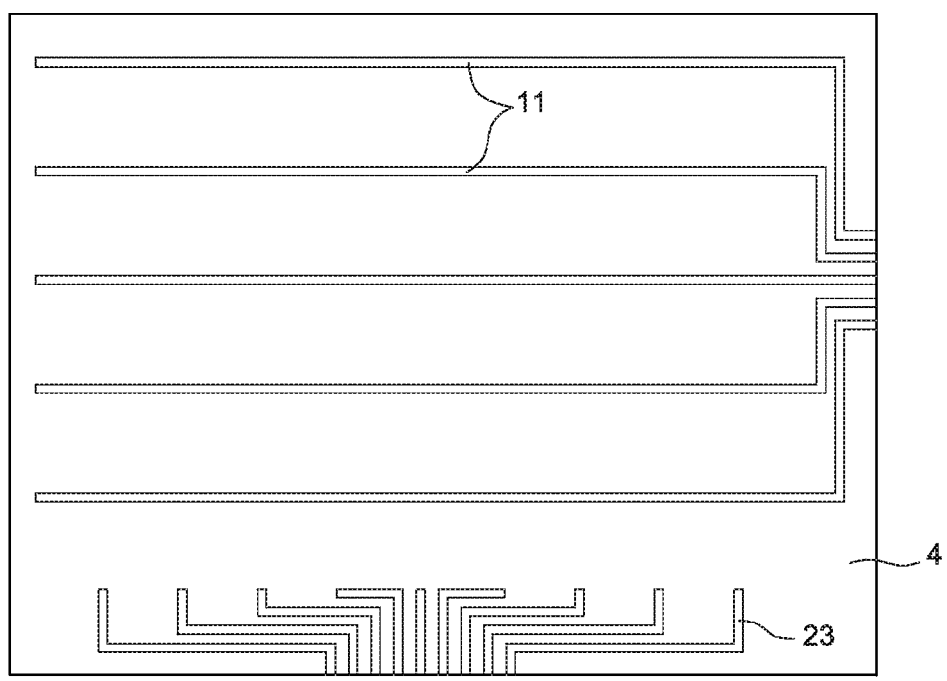
FIG. 2 to FIG. 4 are schematic views showing the steps of forming the touch sensing circuit pattern according to a preferred embodiment of the invention.

With reference to FIG. 2, a plurality of first axial conductive lines 11 parallel with each other and a plurality of second directional metal lines 23 are formed on a transparent substrate 4. The first axial conductive lines 11 and the second directional metal lines 23 are made of a non-transparent conductive material such as aurum, silver, copper, aluminum or other metal material. The non-transparent conductive material is coated on the transparent substrate 4 by sputtering or other equivalent process and then forms the first axial conductive lines 11 and the second directional metal lines 23 by exposing, developing and etching.

Figure 3:
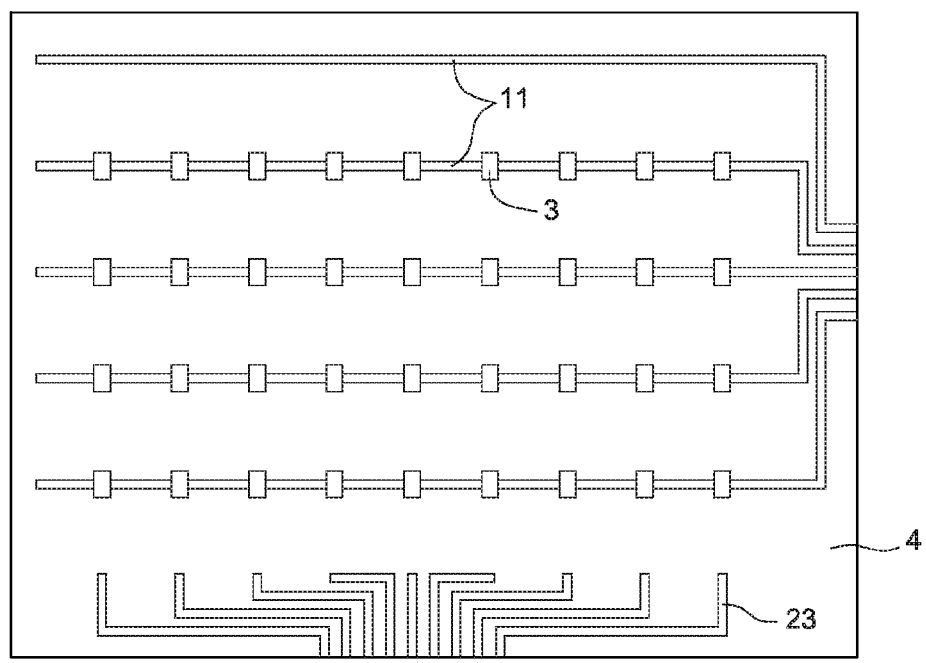

With reference to FIG. 3, a plurality of insulation barriers 3 are formed on each of the first axial conductive lines 11. The insulation barriers 3 are made of an insulation material such as silicon dioxide or other equivalent insulation material. The insulation material is coated on the first axial conductive lines 11 by sputtering and then to form the insulation barriers 3 by exposing, developing and etching.

Figure 4:
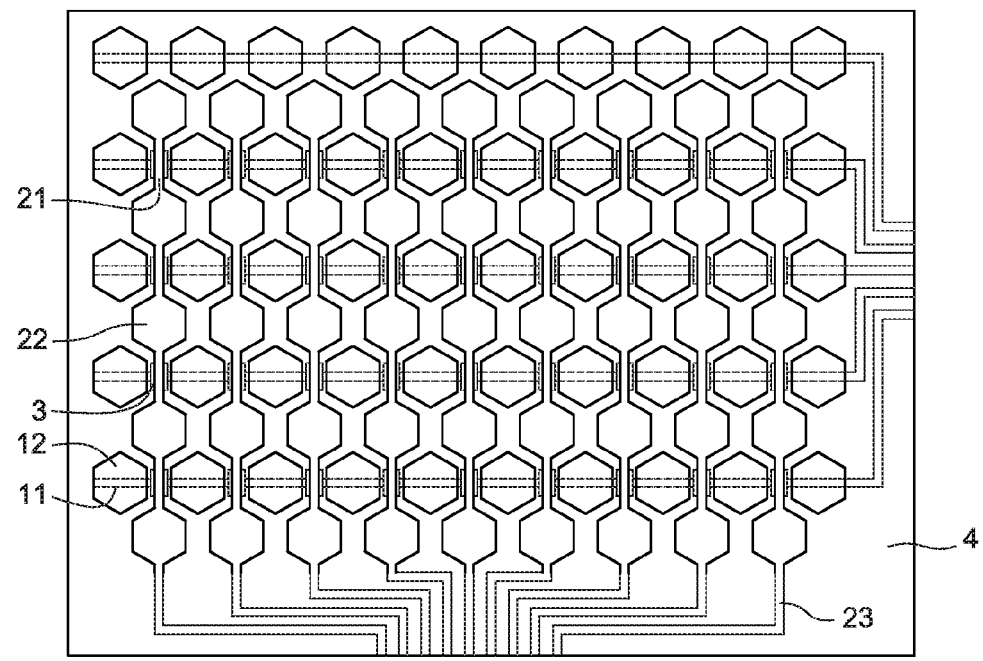

With reference to FIG. 1 and FIG. 4, a plurality of separated first axial electrodes 12 and a plurality of separated second axial electrodes 22 and a plurality of parallel second axial conductive lines 21 are formed on the transparent substrate 4, according to the positions of the first axial conductive lines 11, the second directional metal lines 23 and the insulation barriers 3.

Every two adjacent first axial electrodes 12 are arranged on two sides of a corresponding insulation barrier 3 along the first direction so as to be connected by a corresponding first axial conductive line 11.

Every two adjacent second axial electrodes 22 are arranged on two sides of the first axial conductive line 11 along the second direction.

The second axial conductive lines 21 are across on the insulation barriers 3 and connect to the second axial electrodes 22. Each second axial conductive line 21 is connected to a corresponding second directional metal line 23 so as to form a touch sensing circuit pattern. The first axial electrodes 12, the second axial conductive lines 21 and the second axial electrodes 22 may be made of a transparent conductive material such as ITO (Indium Tin Oxide) to be coated on the transparent substrate 4 by sputtering or other equivalent ways.

The transparent substrate 4 may be made of glass, rubber, plastic or other transparent insulation material.

The first axial conductive lines 11 are overlapped by a black matrix for shielding light of a shielding layer on a display panel. The shielding layer can be omitted because the first conductive lines 11 can be utilized to shield light for the display panel. Furthermore, the first axial conductive lines 11 also can be made of a transparent conductive material such as ITO. The transparent conductive material is coated on the transparent substrate 4 by sputtering and then to form the first axial conductive lines 11 by exposing, developing and etching.

According to the above description, the first axial electrodes 12 and the second axial electrodes 22 can be formed on the transparent substrate 4 by sputtering, exposing, developing and etching at one time. Thus, the process of forming the touch sensing circuit pattern is simplified.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a touch sensing circuit pattern, comprising:
    forming a first axial conductive line on a first surface of a transparent substrate;
    forming an insulation barrier on the first axial conductive line;
    forming two separated first axial electrodes, two separated second axial electrodes and a second axial conductive line on said first surface of said transparent substrate,
    wherein the first axial electrodes are arranged on two sides of the insulation barrier along a first direction so as to be connected by the first axial conductive line;
    the second axial electrodes are arranged on two sides of the first axial conductive line along a second direction; and
    the second axial conductive line is across the insulation barrier and connects to the second axial electrodes to form a touch sensing circuit pattern.

2. The method of claim 1, wherein the first axial conductive line is made of non-transparent conductive material.

3. The method of claim 1, wherein the first axial conductive line is made of transparent conductive material.

4. The method of claim 1, wherein the first axial electrodes, the second axial conductive line and the second axial electrodes are made of transparent conductive material.

5. A method of forming a touch sensing circuit pattern, comprising:
    forming a plurality of parallel first axial conductive lines on a first surface of a transparent substrate;
    forming a plurality of separated insulation barriers on the first axial conductive lines;
    forming a plurality of separated first axial electrodes, a plurality of separated second axial electrodes and a plurality of parallel second axial conductive lines on said first surface of said transparent substrate,
    wherein two adjacent first axial electrodes are arranged on two sides of a corresponding insulation barrier along a first direction so as to be connected by a corresponding first axial conductive line;
    two adjacent second axial electrodes are arranged on two sides of the first axial conductive line along a second direction; and
    the second axial conductive lines are across the insulation barriers and connect to the second axial electrodes to form a touch sensing circuit pattern.

6. The method of claim 5, wherein the first axial conductive lines are made of non-transparent conductive material.

7. The method of claim 5, wherein the first axial conductive lines are made of transparent conductive material.

8. The method of claim 5, wherein the first axial electrodes, the second axial conductive lines and the second axial electrodes are made of transparent conductive material.

9. A method of forming a touch sensing circuit pattern, comprising:
    forming a plurality of parallel first axial conductive lines on a first surface of a transparent substrate;
    forming a plurality of separated insulation barriers on the first axial conductive lines;
    forming a plurality of separated first axial electrodes, a plurality of separated second axial electrodes and a plurality of parallel second axial conductive lines on said first surface of said transparent substrate,
    wherein each two adjacent first axial electrodes are arranged on two sides of a corresponding insulation barrier along a first direction so as to be connected by a corresponding first axial conductive line;
    each two adjacent second axial electrodes are arranged on two sides of the first axial conductive line along a second direction;
    the second axial conductive lines are across the insulation barriers and connect to the second axial electrodes to form a touch sensing circuit pattern; and
    wherein forming the first axial conductive lines further comprises sputtering a conductive material on the substrate and forming the second axial conductive lines further comprises sputtering a conductive material on the substrate, the substrate already bearing the first axial conductive lines and separated insulation barriers.

10. The method of claim 9, further including forming a plurality of second directional metal lines on the first surface of a transparent substrate separate from said plurality of parallel first axial conductive lines when forming said plurality of parallel first axial conductive lines, wherein said plurality of second axial conductive lines connect to said plurality of second directional lines.

11. The method of claim 9, wherein the first axial conductive lines are made of non-transparent conductive material.

12. The method of claim 9, wherein the first axial conductive lines are made of transparent conductive material.

13. The method of claim 9, wherein the first axial electrodes, the second axial conductive lines and the second axial electrodes are made of a transparent conductive material.

14. The method of claim 9, further including exposing, developing and etching said sputtered conductive material to form the first axial conductive lines and the second axial conductive lines.

15. The method of claim 11, wherein the non-transparent conductive material is a metal material.

16. The method of claim 15 wherein the metal material comprises at least one of aurum, silver, copper, and aluminum.

17. The method of claim 12 wherein the transparent conductive material is an ITO (Indium Tin Oxide).

18. The method of claim 13 wherein the transparent conductive material is an ITO (Indium Tin Oxide).

19. A method of forming a touch sensing circuit pattern, comprising:
    forming a plurality of parallel first axial conductive lines and a plurality of second directional metal lines on a first surface of a transparent substrate;
    coating an insulation material on the first axial conductive lines to form a plurality of separated insulation barriers;
    forming a plurality of separated first axial electrodes, a plurality of separated second axial electrodes and a plurality of parallel second axial conductive lines on said first surface of said transparent substrate,
    wherein each two adjacent first axial electrodes are arranged on two sides of a corresponding insulation barrier along a first direction so as to be connected by a corresponding first axial conductive line;
    each two adjacent second axial electrodes are arranged on two sides of the first axial conductive line along a second direction;
    the second axial conductive lines are formed across the insulation barriers and connect to the second axial electrodes and the second directional metal lines to form a touch sensing circuit pattern.

20. The method of claim 19, wherein the first axial conductive lines and the second directional metal lines are made of non-transparent conductive material.

21. The method of claim 19, wherein the first axial conductive lines, the first axial electrodes, the second axial conductive lines and the second axial electrodes are made of transparent conductive material.

22. The method of claim 19, wherein coating an insulation material to form a plurality of separated insulation barriers further comprises sputtering said insulation material to form said coating.

23. The method of claim 22, further including exposing, developing and etching to form the insulation barriers after the sputtering.

24. The method of claim 19, wherein the insulation material is as silicon dioxide.

25. A method of forming a touch sensing circuit pattern, comprising:
    forming a plurality of parallel first axial conductive lines and a plurality of second directional metal lines on a first surface of a transparent substrate;
    forming a plurality of separated insulation barriers on the first axial conductive lines;
    sputtering a conductive material on said first surface of said transparent substrate to form a plurality of separated first axial electrodes, a plurality of separated second axial electrodes and a plurality of parallel second axial conductive lines;
    wherein two adjacent first axial electrodes are arranged on two sides of a corresponding insulation barrier along a first direction so as to be connected by a corresponding first axial conductive line;
    two adjacent second axial electrodes are arranged on two sides of the first axial conductive line along a second direction;
    the second axial conductive lines are across the insulation barriers and connect to the second axial electrodes to form a touch sensing circuit pattern.

26. The method of claim 25, wherein the first axial electrodes, the second axial conductive lines and the second axial electrodes are made of transparent conductive material.

27. The method of claim 25, further including exposing, developing and etching to form the first axial electrodes, the second axial electrodes and the second axial conductive lines after the sputtering.

28. The method of claim 26 wherein the transparent conductive material is an ITO (Indium Tin Oxide).

29. A method of forming a touch sensing circuit pattern, comprising:
    forming a plurality of parallel first axial conductive lines and a plurality of second directional metal lines on a first surface of a transparent substrate;
    forming a plurality of separated insulation barriers on the first axial conductive lines;
    forming a plurality of separated first axial electrodes, a plurality of separated second axial electrodes and a plurality of parallel second axial conductive lines on said first surface of said transparent substrate,
    wherein each two adjacent first axial electrodes are arranged on two sides of a corresponding insulation barrier along a first direction so as to be connected by a corresponding first axial conductive line;
    each two adjacent second axial electrodes are arranged on two sides of the first axial conductive line along a second direction;
    the second axial conductive lines are across the insulation barriers and connect to the second axial electrodes and the second directional metal lines to form a touch sensing circuit pattern; and
    wherein the first axial conductive lines are overlapped by a black matrix for a display.

30. The method of claim 29, wherein the first axial conductive lines and the second directional metal lines are made of non-transparent conductive material.

31. The method of claim 29, wherein the first axial conductive lines, the first axial electrodes, the second axial conductive lines and the second axial electrodes are made of transparent conductive material.

32. The method of claim 30, wherein the non-transparent conductive material is a metal material.

33. The method of claim 32 wherein the metal material comprises at least one of aurum, silver, copper, and aluminum.

34. The method of claim 31 wherein the transparent conductive material is an ITO (Indium Tin Oxide).

35. The method of claim 29, further including coating a conductive material on the transparent substrate to form the first axial conductive lines and the second axial conductive lines.

36. The method of claim 35, wherein coating said conductive material on the transparent substrate further comprises sputtering said conductive material.

37. The method of claim 36, further including exposing, developing and etching to form the first axial conductive lines and the second axial conductive lines after the sputtering.

38. The method of claim 29, further including coating an insulation material on the transparent substrate to form the insulation barriers.

39. The method of claim 38, wherein coating the insulation material on said transparent substrate further comprises sputtering said insulation material.

40. The method of claim 39, further including exposing, developing and etching to form the insulation barriers after the sputtering.

41. The method of claim 38, wherein the insulation material is a silicon dioxide.

42. The method of claim 29, further including coating a conductive material on the transparent substrate to form the first axial electrodes, the second axial electrodes and the second axial conductive lines.

43. The method of claim 42, wherein coating the conductive material on the transparent substrate further comprises sputtering said conductive material.

44. The method of claim 43, further including exposing, developing and etching to form the first axial electrodes, the second axial electrodes and the second axial conductive lines after the sputtering.

* * * * *